April 10, 1962   C. W. MOSSBERG   3,028,772
LIQUID COOLED COUNTER-BORING TOOL

Filed July 31, 1959  2 Sheets-Sheet 1

INVENTOR.
Carl W. Mossberg.
BY Wood, Herron & Evans.
ATTORNEYS.

April 10, 1962     C. W. MOSSBERG     3,028,772
LIQUID COOLED COUNTER-BORING TOOL
Filed July 31, 1959     2 Sheets-Sheet 2

INVENTOR.
Carl W. Mossberg.
BY
Wood, Herron & Evans.
ATTORNEYS.

United States Patent Office 3,028,772
Patented Apr. 10, 1962

3,028,772
LIQUID COOLED COUNTER-BORING TOOL
Carl W. Mossberg, 6514 Hamilton Ave., Apt. 1,
Cincinnati, Ohio
Filed July 31, 1959, Ser. No. 830,863
1 Claim. (Cl. 77—58)

This invention relates to counter-boring tools and in particular to a tool of this character arranged to project flow streams of liquid coolant to the cutting end of the tool during the counter-boring operation.

One of the primary objectives of the present invention has been to provide a heavy duty, power-operated counter-boring tool having coolant delivery means, whereby the tool is capable of machining workpieces formed of extremely hard metal and other materials which cause rapid wear or outright destruction of conventional tools.

The counter-boring tool of the present invention is intended particularly as a companion to the coolant type drill disclosed in Patent 2,817,983, issued to Carl W. Mossberg on December 31, 1957. The drilling tool of the patent generally comprises a shank having an axial coolant bore and having a cutting bit formed of a flat piece of hard material, preferably carbide, seated in the cutting end of the tool and bisecting the open end of the axial bore to provide coolant nozzles. The cutting end of the drill is machined to provide radial channels communicating with the nozzles and arranged to project flow streams of coolant across the cutting edges and work surface during the drilling operation, thus adapting the tool to the machining of extremely hard materials.

The counter-boring tool of the present invention likewise comprises a cylindrical shank having an axial coolant bore and having cutting bits of hardened material bonded to the cutting end of the tool. The tool is arranged to project flow streams of coolant across each cutting edge to maintain the cutting end at a safe operating temperature while the cuttings are flushed from the cutting zone as fast as they are formed in the bore hole. By virtue of the present improvements, the tool is capable of machining at a sustained production rate, materials which cannot be worked with conventional tools, or which quickly destroy such tools.

A further objective of the present invention has been to provide a simple, efficient structure for projecting the flow streams of coolant across the cutting edges and surface of the work in the critical cutting zone during the counter-boring operation.

According to this aspect of the invention, the working end of the tool includes a pilot stud having a mounting stem telescopically interfitted into the lower portion of the coolant bore and locked therein by a set screw to guide the tool axially relative to the hole being counter-bored. The stem is provided with flutes or coolant grooves extending lengthwise and aligned with the cutting edges, the flutes being converted into restricted passageways when the stem is inserted into the bore so as to project high velocity flow streams of liquid coolant from the axial bore to the cutting end of the tool. The pilot stud is larger in diameter than the stem and includes a top surface or shoulder which is spaced downwardly from the cutting edges. During the counter-boring operation, the stud blocks off the hole which is being counter-bored, while its upper surface deflects the flow streams laterally across the cutting edges and across the surface of the work in the critical cutting zone.

The demountable pilot stud thus performs the two functions of guiding the tool axially with respect to the hole and also of creating jet passageways for projecting the flow streams of coolant to the cutting edges. The detachable stud has the further advantage of adapting a tool to the counter-boring of holes of different diameters by interchanging the pilot stud in accordance with the diameter of the hole which is to be counter-bored.

In order to flush the cuttings from the counter-bore, the cutting edges of the bits are ground to create a chip breaking action and each bit is mounted adjacent one side of an external flute or channel formed in the shank of the tool, each bit being located at the trailing side of the flute, in the direction of tool rotation. Since the internal coolant flutes of the stem are located in alignment with the respective cutting edges, the liquid coolant passes from the lower end of each internal flute to be deflected laterally by the top surface of the pilot stud and directly across the cutting edges and surface of the work. Accordingly, the coolant streams pick up the cuttings as they are formed, then the streams pass upwardly through the passageways which are delineated by the external flutes and surface of the counter-bore to discharge from the upper end of the hole.

The present tool is intended to be mounted in the spindle of a machine tool, for example, the spindle of a radial drill which is provided with a power feed mechanism. The spindle is of the type provided with a coolant bore and having a chuck for coupling the tool shank in fluid-tight connection with the spindle for conducting the fluid under pressure from the spindle bore to the axial bore of the tool. The liquid coolant may be fed in from the upper end of the spindle or through a swivel gland which may be mounted on the lower portion of the spindle above the chuck, both structures being conventional in the machine tool industry.

The various other features and advantages of the present invention will be more fully disclosed to those skilled in the art from the following detailed description taken in conjunction with the drawings.

Figure 1:
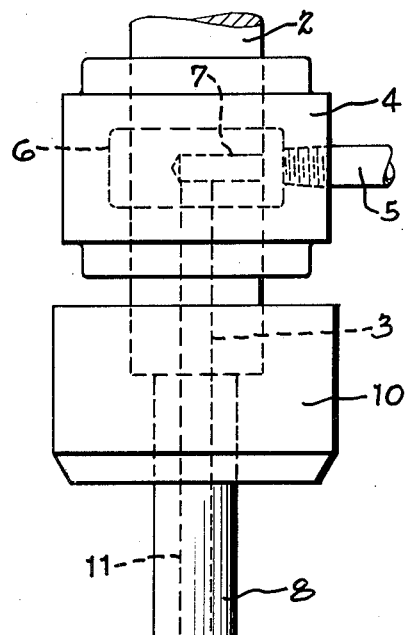
FIGURE 1 is a side view showing the spindle of a drilling machine with a liquid cooled counter-boring tool of the present invention mounted therein.

Described generally with reference to FIGURE 1, the counter-boring tool embodying the principles of this invention, which is indicated generally at 1, is shown mounted in the spindle 2 of a drilling machine, such as the spindle of a radial drill which is provided with means for feeding liquid coolant under pressure to the axial bore 3 of the spindle. The tool is intended for general utility either in machines which rotate and feed the spindle relative to the work or in other machines in which the tool is mounted in a stationary position while the work is rotated relative to the tool.

In the example illustrated, the coolant is supplied through a swivel joint or gland 4, which represents a commercial structure providing a fluid-tight connection with the rotating spindle, the coolant being advanced to the gland by a conduit 5. As indicated in broken lines in FIGURE 1, the body of the gland 4 includes an internal chamber 6 surrounding the spindle, and the spindle includes a lateral bore 7 providing communication between the chamber 6 and axial spindle bore 3, such that the coolant from conduit 5 is advanced under pressure to the shank of the tool.

The shank 3 of the tool is secured in axial alignment with the end of the spindle by a conventional chuck 10 which provides a fluid-tight connection arranged to conduct the coolant from the spindle bore 3 to the axial bore 11 of the tool shank. From the bore 11, the coolant is delivered to the cutting end of the tool, as explained in detail below.

Figure 2:
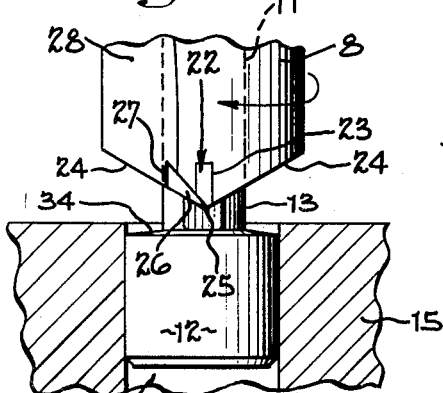
FIGURE 2 is an enlarged fragmentary view detailing the cutting end of the tool at the start of a counter-boring operation.
Figure 3:
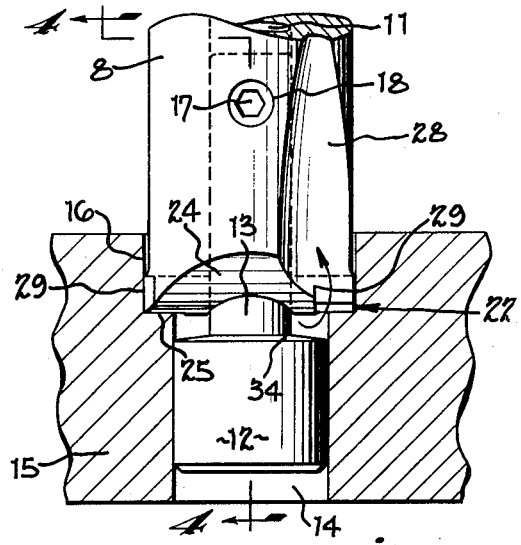
FIGURE 3 is a view similar to FIGURE 2, showing the tool at completion of a counter-boring operation.
Figure 4:
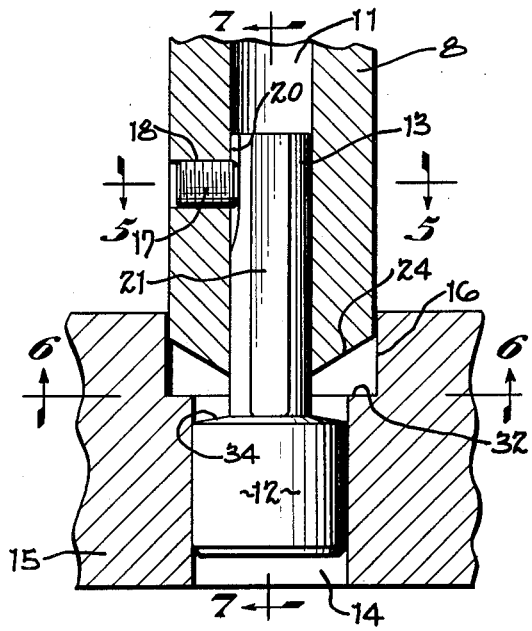
FIGURE 4 is a sectional view taken along line 4—4 of FIGURE 3, detailing the internal construction of the counter-boring tool.

Referring to FIGURES 2–4, the cutting end of the tool is provided with a pilot stud 12 having a mounting stem 13 which telescopically interfits the axial bore 11 of the tool shank. The stud 12 is designed to rotatably interfit the hole 14 of the workpiece 15 so as to guide the cutting end of the tool as it machines the counter-bore 16. In counter-boring operations with the present tool, the holes 14 are first located and drilled into or through the workpiece, later to be utilized in centering the counter-boring tool. In machining hard materials, for example, certain exotic metals for which the present counter-boring tool is particularly intended, the holes 14 are drilled with a coolant type drill as disclosed in the Patent No. 2,817,983 to Carl W. Mossberg, as noted above. In a typical operation, the pattern of holes 14 is first drilled in the workpiece, then the workpiece is counter-bored, the machine tool preferably being provided with a power operated spindle feed mechanism and with a suitable depth gauge for determining the depth of the counter-bore.

The pilot stud 12, which interfits the hole 14, is demountably carried in the tool to adapt the counter-boring tool to holes of different diameters, simply by interchanging the studs 12. For this purpose, the mounting stem 13 is engaged by a set screw 17 of the socket type, which is threaded into a lateral bore 18 formed in the lower portion of the tool shank. The upper portion of stem 13 is milled to provide a flat 20 which is engaged by the inner end of the set screw 17 to clamp the stem rigidly in place.

Figure 5:
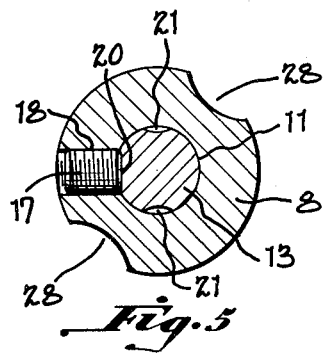
FIGURE 5 is a sectional view taken along line 5—5 of FIGURE 4, further illustrating the construction of the tool.
Figure 6:
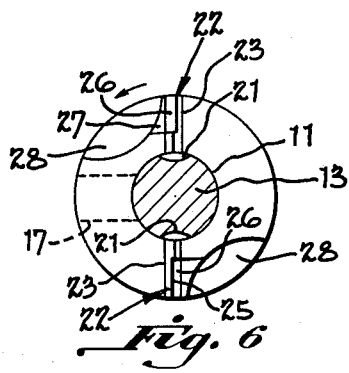
FIGURE 6 is a sectional view taken along line 6—6 of FIGURE 4, looking toward the cutting end of the tool.
Figure 7:
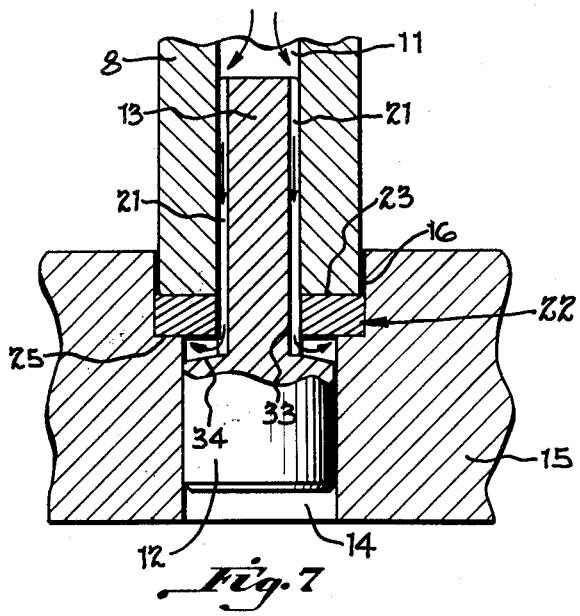
FIGURE 7 is a longitudinal sectional view taken along line 7—7 of FIGURE 4, illustrating the coolant passageways of the tool.

As best shown in FIGURES 5–7, the stem 13 is provided with a pair of straight flutes or channels 21—21 on opposite sides, the flutes being displaced angularly from the set screw 17. These flutes create restricted coolant passageways leading from the axial bore 11 to the cutting end of the tool and are aligned with the cutting bits 22—22, as viewed in FIGURE 6. The internal flutes 21 therefore project flow streams of coolant directly toward the cutting zone while the stud 12, which blocks off the hole 14, deflects the flow streams outwardly across the cutting bits as indicated by the arrows in FIGURES 3 and 7.

As viewed in FIGURE 2, the cutting inserts or bits 22 are fitted into slots 23 which are machined diametrically across the end portion of the shank 8. The cutting bits consist of pieces of flat hard material, for example, carbide and are permanently bonded in the slots by means of silver solder, brazing material or other fusible metal. After the bits are mounted, the cutting end of the tool is machined to provide the opposed inclined end faces 24—24 which extend across the exposed ends of the cutting bits to delineate cutting edges 25—25 at diametrically opposite sides of the tool.

As indicated in FIGURES 2 and 6, the working face 26 of each bit, in the direction of rotation of the tool, is delineated by an inclined flat 27 machined into the tapered face 24 and cutting across the bit, the angle of the flat being designed to create a chip breaking action, which makes it possible to flush the cuttings from the bore hole. The external flutes 28—28 at opposite sides of the tool, are located in advance of each bit, in the direction of tool rotation, as indicated by the arrows, and the inclined flats 27 break into the flutes at their trailing sides, causing the broken chip particles to be advanced with the coolant directly into the flutes to be discharged upwardly from the counter-bore.

It will be noted that the cutting resistance acts upon each bit in a direction to force the bit against the backing area delineated by the inclined face 24. The inclined faces 24 also delineate the clearance angle or rake on the trailing side of each cutting bit. It will be understood at this point, that the angle or the faces 24 and flat 27, which determine the working face and rake angle, may be varied to suit the character of various types of material for which the tool is used.

As shown in FIGURE 3, the outer edges 29 of the cutting bits may project slightly beyond the periphery of the cylindrical shank and present side cutting edges which act upon the periphery of the counter-bore as the rotating tool is fed in. It will also be noted in this view, that the working faces 26 of the cutting bits are disposed in a plane at right angles to the axis of rotation of the tool so as to machine a square shoulder 32 (FIGURE 4) which delineates the lower end of the counter-bore.

As shown in FIGURE 7, the inner edge 33 of one or both of the bits may project inwardly beyond the surface of the axial bore and into the passageway delineated by the internal flute 21. The projecting edge 33 acts as a key to locate the internal flutes in alignment with the cutting edges. In other words, the projecting edge of the bit prevents the stem 13 from being inserted into the axial bore unless the stem is rotated to bring the flutes into alignment with the cutting bits.

At the start of the counter-boring operation, with the pilot stud 12 journalled in the hole 14 (FIGURE 2), the tool is fed downwardly and coolant under pressure is advanced through the axial bore 11 to be accelerated during passage through the internal flutes 21, which provide restricted passageways. At the lower end of the flutes, the high velocity streams impinge against the top surface 34 of the stud 12 and thus are deflected laterally across the cutting edges 25 and upon the material being cut. The flow streams thereby keep the cutting bits and end portions of the tool at a safe operating temperature and also provide maximum cutting efficiency.

Since the stud 12 blocks off the hole below the counter-bore, the flow streams of coolant pass upwardly through the external flutes 28 at opposite sides, carrying the cuttings, which are broken into small particles through the chip breaking action of the cutting edges. Since the cuttings are removed as rapidly as they are formed, the bore hole is kept clear of cuttings to provide maximum efficiency. The flow rate of the coolant is sufficiently high to flush the cuttings entirely clear from the upper end of the counter-bore and at this point, the coolant is collected and re-circulated back to the spindle, the cuttings being first strained or separated from the coolant by means in the coolant system.

The action of the coolant streams is critical in cutting materials which are extremely hard or are otherwise difficult to machine, particularly those which cause rapid heating and rapid deterioration or outright destruction of a conventional counter-boring tool. Experimental use has indicated that the present tool is capable of counter-boring the hardest available metals, ceramics and other materials under sustained operation with little indication of wear, whereas these materials cannot be machined with conventional dry cutting tools. The successful operation of the present tool arises from the fact that a large volume of coolant flows directly across the most critical cutting area so as to rapidly dissipate the heat which is generated as a consequence of the cutting action. The cutting action is further improved by the lubricating action of the coolant and by the fact that the cuttings are carried away as fast as they are formed, thereby to eliminate interference and friction in the cutting area. As a result, the tool is capable of performing counter-boring operations in the indicated materials at a production rate which is equal to or even better than the established rates for the same operation upon conventional, relatively soft materials.

Figure 8:
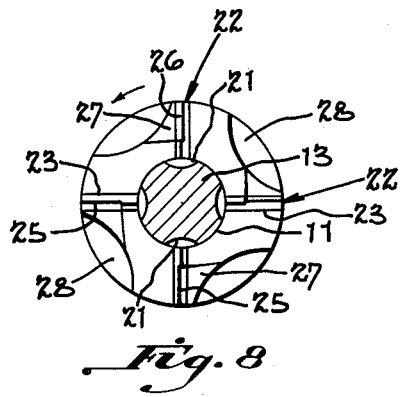
FIGURE 8 is a view similar to FIGURE 6, showing a modified version, in which the tool is provided with four cutting edges.

The tool shown in FIGURE 8 represents a modification in which the cutting end is provided with four cutting edges 25. In this structure, the stem 13 is provided with four internal flutes or channels 21 which are aligned with the respective cutting edges to project a flow stream of coolant across each cutting edge. Each cutting edge is provided with an external flute 28, such that the coolant advances directly across each cutting edge to discharge the cuttings by way of the external flutes.

Another advantage of the detachable mounting stem 13 arises from the fact that the restricted passageways delineated by the flutes 21 are readily cleared if they should become clogged. In the event of clogging, the set screw 17 is loosened and the stem is withdrawn from its bore so that the exposed flutes may be readily cleaned. The detachable connection has the further advantage of permitting the pilot stud 12 to be adjusted axially so as to change the spacing between the cutting edges 25 and the upwardly facing surface 34 of the stud. This permits the deflection of the coolant to be varied to suit various operating conditions which may be encountered, such as different metals or hole sizes.

Having described my invention, I claim:

A rotary tool for counter-boring a hole in a workpiece while supplying coolant to the cutting zone comprising, a tool shank having an axial bore and having a cutting end including a plurality of cutting edges adapted to machine a counter-bore, a stem telescopically secured in the axial bore at said cutting end and projecting outwardly therefrom, a pilot element at the outer end of said stem, said pilot element having an upper surface spaced downwardly from said cutting edges, said stem having a plurality of coolant flutes extending lengthwise thereof, said coolant flutes being disposed substantially in alignment with respective cutting edges and delineating restricted coolant passageways communicating with the axial coolant bore, said passaegways adapted to project coolant toward the upper surface of said pilot element, said upper surface adapted to deflect the coolant streams laterally toward said cutting edges, thereby to flush the cuttings from the cutting zone during the counter-boring operation, the periphery of said shank above said cutting end having a plurality of chip discharge flutes formed therein, said chip discharge flutes being located substantially in alignment with respective cutting edges, whereby said coolant with the cuttings entrained therein is discharged upwardly through said chip discharge flutes after passing across said cutting edges.

References Cited in the file of this patent
UNITED STATES PATENTS

| | | |
|---|---|---|
| 967,255 | Snell et al. | Aug. 16, 1910 |
| 1,016,116 | Walters | Jan. 30, 1912 |
| 2,237,901 | Chun | Apr. 8, 1941 |
| 2,817,983 | Mossberg | Dec. 31, 1957 |
| 2,873,632 | Bissey | Feb. 17, 1959 |